Patented Aug. 28, 1945

2,383,869

UNITED STATES PATENT OFFICE 2,383,869

LUBRICANT AND PREPARATION

Eugene Lieber, West New Brighton, Staten Island, N. Y., and Raymond M. Dean, Westfield, N. J., assignors to Standard Oil Development Company, a corporation of Delaware No Drawing. Application December 30, 1942,
Serial No. 470,643

19 Claims. (Cl. 252—46)

This invention relates to novel types of lubricants and methods of preparing same, and more particularly to the addition of a substance having pour-depressing properties to a waxy mineral lubricating oil.

Broadly, the invention comprises using as a pour depressor a resinous substance obtained as a by-product of the Reimer-Tiemann reaction which is typified by the reaction of sodium phenate with chloroform to produce hydroxy benzaldehyde as represented by the following equation:

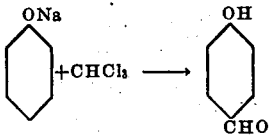

The Reimer-Tiemann reaction affords a route to the synthesis of hydroxy-aromatic aldehydes and has long been known to the art of organic synthesis. The mechanism of the reaction is not certain but it is believed that the following series of steps may be followed, involving chiefly the C-alkylation of the phenol by means of the chloroform:

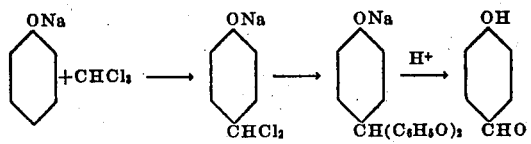

The hydroxy aromatic aldehyde can be recovered by a variety of procedures well known to the organic chemist, e. g., by steam distillation. However, regardless of the method of recovery used, there is obtained besides the hydroxy aldehyde, a resinous material.

It has now been discovered that in carrying out the Reimer-Tiemann reaction, if instead of using sodium phenate a corresponding alkyl derivative thereof is used which contains more than 2, and preferably more than 3, aliphatic carbon atoms, the resulting resinous by-product will be soluble in mineral hydrocarbon oils, and will have valuable pour-depressing properties when used as an additive in waxy mineral lubricating oils. This additive also assists in preventing the premature deposition of wax in other pour depressor treated oils, e. g., waxy mineral lubricating oils to which has been added a small amount of a pour depressor, such as one marketed under the trade name "Paraflow," which is made by Friedel-Crafts condensation of chlorinated wax with naphthalene, or one marketed under the trade name "Santo-pour," which is made by condensation of chlorinated wax with phenol.

The additive of this invention also can be used for stabilizing the high temperature stability of extreme pressure lubricating additives containing active chlorine and sulfur, such as those made by reacting chlorinated kerosene with sodium polysulfide or with sodium xanthate.

In carrying out the present invention instead of using a sodium alkylated phenate directly as raw material, or other alkali metal salt of a hydroxy alkylated aromatic compound, such alkali metal salt may conveniently be made in situ by merely mixing aqueous caustic alkali with an equivalent amount of the desired hydroxy alkylated aromatic compound. As an illustration, sodium hydroxide dissolved in water may be mixed with amyl phenol and heated slightly to insure completion of the reaction, which results in the separation of sodium amyl phenate from the aqueous liquid.

Similarly, many other phenolic materials may be used in place of the amyl phenol, such as the following:

Petroleum phenols[1]
Diisobutyl phenol (isooctyl phenol)
Triisobutyl phenol
Tetra-isobutyl phenol
Sulfide of tert-amyl phenol
Sulfiide of diisobutyl phenol
Mono-wax phenol
Butyl hydroxydiphenyl
Mono-amyl-anthranol
Chloro amyl phenol
Mono-amyl beta naphthol It is, of course, understood that instead of using caustic soda it is possible to use caustic potash. It is generally desirable to use this alkali in the form of an aqueous solution having a concentration of about 25% to 60%.

Although the proportions in which the primary reactants should be used may vary somewhat according to the specific materials used and according to the reaction conditions, in general about 0.1 to 1 mol, and preferably about 0.3 to 0.8 mol of the alkylated hydroxy aromatic compound should be used per mol of chloroform.

The reaction temperature required may vary to some extent according to the particular alkyl phenol used, but normally will be within the approximate limits of room temperature to about 250° F. or so, and preferably about 100°-200° F.

[1] (E. g., mixed alkylated phenol averaging about 4 aliphatic carbon atoms per molecule)

The reaction time depends upon the materials used and the temperature but ordinarily will range from a few minutes to from 20-30 hours, preferably about 1-10 hours. If a reaction temperature is used which is actually above the boiling point of the chloroform, suitable means should be provided such as a reflux condenser, or carrying out the reaction under slight superatmospheric pressure, to prevent undue vaporization or loss of the chloroform during the reaction.

After the reaction has been completed, various methods of recovery may be used, but a suitable method is to cool the reaction mixture, dilute it with a suitable inert diluent or solvent, such as a refined kerosene or naphtha, then acidify as by using a 50% aqueous hydrochloric acid solution in order to convert the sodium salt of the aldehyde formed into the corresponding hydroxy aldehyde, and finally after separating the aqueous phase containing sodium chloride and excess acid, distilling the solvent solution to remove the kerosene or other solvent used and the hydroxy alkylated aromatic aldehyde formed as the primary product, and finally, preferably using distillation under reduced pressure, as with steam or vacuum, carrying the distillation temperature up to about 600° F. or so to leave a resinous by-product as distillation residue.

This resinous distillation residue, which is the desired substance to be added to lubricating oils according to this invention, is a relatively high molecular weight product which has generally a brown or other dark color and has the consistency or texture of a soft resin. It should be added to waxy mineral lubricating oils in concentration of about 0.5% to 10.0%, and preferably about 0.2% to 5.0%, for depressing the pour points of such oils. It may also be used in similarly small amounts as a dewaxing aid for removing the larger proportion of wax from mineral oils containing excessive amounts of same. It may also be used in small concentrations of about 0.1% to 5.0% as a wax-modifying agent to modify the texture of paraffin wax or compositions containing large amounts of same.

The objects, advantages, and details of the invention will be better understood from the following specific examples which are given merely for the sake of illustration.

*Example 1*

360 grams of sodium hydroxide were dissolved in 800 cc. of water and placed in a round bottom flask. To this was added 200 grams of tertiary amyl phenol.

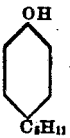

at about 90° C. The sodium phenate separated out as a bulky white material. To this suspension 270 grams of chloroform was added over a period of 20 minutes, through a dropping funnel, the flask having been equipped with a reflux condenser. The mixture was refluxed, without agitation, for 2 hours in a hot water bath. After cooling the reaction mixture was diluted with 2,000 cc. kerosene and then acidified with about 2,000 cc. of 1:1 hydrochloric acid. In order to facilitate neutralization the acidified mixture was agitated at 110° C. After separation, the kerosene extract was distilled with fire and steam to 550° F. in order to remove the solvent and low-boiling products. A bottoms residue comprising 21 grams of a soft brownish resin was obtained as product.

When 1% of the resinous material obtained as described above was added to a waxy oil having a pour point of +30° F., the pour point was reduced to −10° F.

*Example 2*

The following proportion of reagents were used:

| | Grams |
|---|---|
| Tertiary amyl-phenol | 100 |
| Chloroform | 135 |
| NaOH (dissolved in 400 cc. water) | 180 |

The procedure of Example 1 was followed essentially, except that the reaction time was increased to 9 hours. The resinous by-product was recovered as before by extraction with kerosene after acidification. A yield of 7 grams of a soft brown resin was obtained as bottoms product after a fire and steam distillation to 600° F.

When 1% of the resinous material, obtained as described above, was added to a waxy oil having a pour point of +30° F., the pour point was reduced to −10° F.

It is thus apparent that this invention furnishes a valuable commercial outlet for resinous material produced as a by-product in Reimer-Tiemann reactions in which alkylated phenolic substances containing more than 2 aliphatic carbon atoms per molecule are used as raw material.

It is not intended that this invention be limited to any of the specific examples which have been given merely for the sake of illustration, nor unnecessarily by any theory as to the mechanism of the operation of the invention, but only by the appended claims in which it is intended to claim all novelty inherent in the invention as well as all modifications coming within the scope and spirit of the invention.

We claim:

1. Lubricant comprising a major proportion of waxy mineral lubricating oil and a pour-depressing amount of an oil-soluble Reimer-Tiemann reaction product of an alkylated phenol and chloroform.

2. A lubricant comprising a major proportion of a waxy mineral lubricating oil and a pour-depressing amount of an oil-soluble resinous Reimer-Tiemann reaction product of an alkylated phenol and chloroform reacted in the presence of caustic soda.

3. A lubricant comprising a major proportion of a waxy mineral lubricating oil and containing dissolved therein a pour-depressing amount of a high molecular weight resinous Reimer-Tiemann reaction product of sodium tertiary amyl phenate and chloroform.

4. The process of preparing lubricants which comprises subjecting an alkali metal salt of an alkylated phenol containing at least one hydrogen attached to the ring and more than 2 aliphatic carbon atoms to a Reimer-Tiemann reaction with chloroform, and subjecting the reaction products to distillation under reduced pressure up to about 600° F. to obtain a high molecular weight resinous distillation residue, and dissolving the latter in a pour-depressing concentration in a waxy mineral lubricating oil.

5. A lubricant comprising a major proportion of a waxy mineral lubricating oil containing dissolved therein a small amount of a pour depressor comprising essentially a high molecular weight oil-soluble Friedel-Crafts condensation product of chlorinated wax with an aromatic compound, and also containing dissolved therein a small amount of an oil-soluble Reimer-Tiemann reaction product of an alkylated phenol and chloroform.

6. Lubricant comprising a major proportion of a waxy mineral lubricating oil and a pour-depressing amount of an oil-soluble Reimer-Tiemann reaction product of tertiary amyl phenol and chloroform.

7. Lubricant comprising a major proportion of a waxy mineral lubricating oil and a pour-depressing amount of an oil-soluble Reimer-Tiemann reaction product of mono-wax phenol and chloroform.

8. A lubricant comprising a major proportion of a waxy mineral lubricating oil and a pour-depressing amount of an oil-soluble Reimer-Tiemann reaction product of a sulfide of an alkylated phenol and chloroform.

9. A lubricant comprising a major proportion of a waxy mineral lubricating oil and a pour-depressing amount of an oil-soluble resinous Reimer-Tiemann reaction product of tertiary amyl phenol and chloroform reacted in the presence of caustic soda.

10. A lubricant comprising a major proportion of a waxy mineral lubricating oil and a pour-depressing amount of an oil-soluble resinous Reimer-Tiemann reaction product of mono-wax phenol and chloroform reacted in the presence of caustic soda.

11. A lubricant comprising a major proportion of a waxy mineral lubricating oil and a pour-depressing amount of an oil-soluble resinous Reimer-Tiemann reaction product of a sulfide of an alkylated phenol and chloroform reacted in the presence of caustic soda.

12. A lubricant comprising a major proportion of a waxy mineral lubricating oil and containing dissolved therein a pour-depressing amount of a high molecular weight resinous Reimer-Tiemann reaction product of an alkali metal salt of mono-wax phenol and chloroform.

13. A lubricant comprising a major proportion of a waxy mineral lubricating oil and containing dissolved therein a pour-depressing amount of a high molecular weight resinous Reimer-Tiemann reaction product of an alkali metal salt of a sulfide of an alkylated phenol and chloroform.

14. The process according to claim 4 wherein the alkylated phenol is tertiary amyl phenol.

15. The process according to claim 4 wherein the alkylated phenol is mono-wax phenol.

16. The process according to claim 4 wherein the alkylated phenol is an alkylated phenol sulfide.

17. A lubricant according to claim 5 wherein the alkylated phenol is tertiary amyl phenol.

18. A lubricant according to claim 5 wherein the alkylated phenol is mono-wax phenol.

19. A lubricant according to claim 5 wherein the alkylated phenol is an alkylated phenol sulfide.

EUGENE LIEBER.
RAYMOND M. DEAN.